United States Patent
Lamoncha

(10) Patent No.: US 11,302,216 B2
(45) Date of Patent: Apr. 12, 2022

(54) SYSTEM AND METHOD FOR TRACKING THE WEIGHT OF A USER

(71) Applicant: Mark Lamoncha, Columbiana, OH (US)

(72) Inventor: Mark Lamoncha, Columbiana, OH (US)

(*) Notice: Subject to any disclaimer, the term of this patent is extended or adjusted under 35 U.S.C. 154(b) by 246 days.

(21) Appl. No.: 16/600,666

(22) Filed: Oct. 14, 2019

(65) Prior Publication Data

US 2020/0043364 A1 Feb. 6, 2020

Related U.S. Application Data

(63) Continuation of application No. 15/183,281, filed on Jun. 15, 2016, now Pat. No. 10,446,054.

(60) Provisional application No. 62/175,651, filed on Jun. 15, 2015.

(51) Int. Cl.
*G09B 19/00* (2006.01)
*A43B 3/00* (2022.01)
*G09B 5/02* (2006.01)

(52) U.S. Cl.
CPC ........ *G09B 19/0092* (2013.01); *A43B 3/0005* (2013.01); *G09B 5/02* (2013.01)

(58) Field of Classification Search
CPC ...... G09B 19/0092; G09B 5/02; A43B 3/0005
USPC .......................................................... 434/127
See application file for complete search history.

(56) References Cited

U.S. PATENT DOCUMENTS

| | | |
|---|---|---|
| 5,025,575 A | 6/1991 | Lakic |
| 5,179,792 A | 1/1993 | Brantingham |
| 5,199,191 A | 4/1993 | Moumdjian |
| 5,323,650 A | 6/1994 | Fullen et al. |
| 5,398,688 A | 3/1995 | Laniado |
| 5,878,510 A | 3/1999 | Schoesler |
| 6,122,846 A | 9/2000 | Gray et al. |
| 6,305,102 B1 | 10/2001 | Doyle |
| 6,550,160 B2 | 4/2003 | Miller, II |
| 6,725,573 B2 | 4/2004 | Doyle |
| 6,892,477 B2 | 5/2005 | Potter et al. |
| 6,976,321 B1 | 12/2005 | Lakic |
| 7,200,517 B2 | 4/2007 | Darley et al. |
| 7,353,137 B2 | 4/2008 | Vock et al. |
| 7,771,371 B2 | 8/2010 | Avni |
| 7,917,981 B1 | 4/2011 | Lakic |
| 7,998,092 B2 | 8/2011 | Avni et al. |
| 8,375,784 B2 | 2/2013 | Bamberg et al. |

(Continued)

OTHER PUBLICATIONS

Etherington, D., TechCrunch, Apple Patents Smart Shoes That Feature Embedded Sensors, And Alarms For When You Need New Ones, http://techcrunch.com/2013/01/24/apple-patents-smart-shoes-that-feature-embedded-sensors-and-alarms-for-when-you-need-new-ones/, Jan. 24, 2013.

(Continued)

*Primary Examiner* — Robert P Bullington
(74) *Attorney, Agent, or Firm* — Standley Law Group LLP

(57) ABSTRACT

A system for tracking a user's weight includes an insole which is configured to be interchangeably located within one of each of a number of a user's pairs of shoes. A weight sensor located within the insole is configured to detect the weight of the user. A communications interface is located within the insole and is electrically connected to the weight sensor. The communications interface is configured to transmit weight readings from said weight sensor to a computerized device.

17 Claims, 8 Drawing Sheets

(56) References Cited

U.S. PATENT DOCUMENTS

| | | | |
|---|---|---|---|
| 8,587,438 | B2 | 11/2013 | Abernethy et al. |
| 8,764,651 | B2 | 7/2014 | Tran |
| 9,107,475 | B2 | 8/2015 | Ellis |
| 9,839,260 | B1 | 12/2017 | Chang |
| 2003/0084593 | A1 | 5/2003 | Lakic |
| 2004/0131997 | A1 | 7/2004 | McGuire et al. |
| 2005/0022422 | A1 | 2/2005 | Swigart et al. |
| 2006/0130370 | A1 | 6/2006 | Marvin et al. |
| 2007/0084082 | A1 | 4/2007 | Dojan et al. |
| 2008/0167580 | A1 | 7/2008 | Avni et al. |
| 2009/0038182 | A1 | 2/2009 | Lans et al. |
| 2009/0253105 | A1 | 10/2009 | Lepine |
| 2010/0152619 | A1 | 6/2010 | Kalpaxis et al. |
| 2010/0240962 | A1 | 9/2010 | Contant |
| 2011/0054359 | A1* | 3/2011 | Sazonov .............. A61B 5/4866 600/595 |
| 2011/0199205 | A1 | 8/2011 | Kreml |
| 2011/0276312 | A1 | 11/2011 | Shalon et al. |
| 2013/0137943 | A1 | 5/2013 | Pinto Rodrigues |
| 2013/0336519 | A1 | 12/2013 | Connor |
| 2014/0347491 | A1 | 11/2014 | Connor |
| 2014/0377724 | A1 | 12/2014 | Hoover et al. |
| 2015/0093725 | A1* | 4/2015 | Baarman ................ G16H 20/60 434/127 |
| 2015/0305436 | A1 | 10/2015 | Doyle |
| 2018/0344210 | A1 | 12/2018 | Pestl |
| 2020/0163411 | A1 | 5/2020 | Molyneux et al. |

OTHER PUBLICATIONS

Konttila, A., IEEE Xplore Digital Library, Wireless Weight Measurement Shoes, http://ieeexplore.ieee.org/xpl/login.jsp?tp=&arnumber=6098540&url=http%3A%2F%2Fieeexplore.ieee.org%2Fxpls%2Fabs_all.jsp%3Farnumber%3D6098540, Oct. 15-17, 2011.

Meledey, http://www.meledey.com/, Aug. 19, 2015.

Estes, A., Vice Media LLC, Does the World Really Need Smart Silverware?, http://motherboard.vice.com/blog/does-the-world-really-need-smart-silverware, Jan. 7, 2013.

HAPIfork, https://www.hapi.com/product/hapifork, site visited Mar. 23, 2015.

Trew, D., Engadget, HAPILABS introduces HAPIfork (and spoon) smart utensils, brings metrics to your mouthfuls (hands-on), https://www.engadget.com/2013/01/06/hapilabs-introduces-hapifork-and-spoon-smart-utensils-brings/, Jan. 6, 2013.

Zhang, S. et al., Sensors, Detection of Activities by Wireless Sensors for Daily Life Surveillance: Eating and Drinking, pp. 1499-1517, www.mdpi.com/journal/sensors, Mar. 3, 2009.

Choi, C., How 'Smart Teeth' Could Detect Health Habits, http://wwwlivesciencecom/39713smarttoothtrackhealthhabits.html, Sep. 17, 2013.

Dong, Y., Tracking Wrist Motion to Detect and Measure the Eating Intake of Free-Living Humans, Dissertation, May 2012.

Hahn, J., Digital Trends, Bitbite Is An In-Ear Fitness Device That Listens To How Well You're Chewing Your Food, http://www.digitaltrends com/wearables/bitbitewearableeardevicetellswellyoureeatingchewing/, Nov. 15, 2014.

Merriam-Webster Dictionary, Definition of "insole". Accessed Mar. 18, 2019 from <https://www.meriam-webster.com/dictionary/insole>.

Foley, James A. "Eat More Calories for Breakfast and Less Throughout the Day to Lose Weight and Lower Risk of Disease," Nature World News. Published Aug. 5, 2013. Retrieved Feb. 1, 2018. <http://www.natureworldnews.com/articles/3339/20130805/eat-more-calories-breakfast-less-throughout-day-lose-weight-lower.htm>.

* cited by examiner

SYSTEM AND METHOD FOR TRACKING THE WEIGHT OF A USER

CROSS-REFERENCE TO RELATED APPLICATION

This application is a continuation of U.S. application Ser. No. 15/183,281 filed Jun. 15, 2016, which claims priority to provisional application 62/175,651 filed on Jun. 15, 2015, the disclosures of which are hereby incorporated by reference as if fully recited.

TECHNICAL FIELD

Exemplary embodiments of the present invention relate generally to personal electronic devices that assist the user in the maintenance of their health through monitoring their weight.

BACKGROUND AND SUMMARY OF THE INVENTION

Management of a person's weight is an important factor in maintaining that person's health. Unfortunately, with the ready availability of prepackaged foods and frequent distractions from sources such as cell phones, tablets, and televisions, it is not unusual for a person to consume more food and snacks than they realize. What is needed is a way for a person to track their consumption of food and the impact that consumption has on their weight.

In an embodiment of the invention, a sensor may be positioned under a user's feet and may be configured to determine the weight of the user. The sensor may be in electronic communication with a computing device such as, but not limited to, a smartphone, smart watch or tablet. In an embodiment of the invention, the computing device may be configured to track the user's weight over a period of time. In an embodiment of the invention, a user may track their consumption of food through the use of a second sensor mounted on or near a hand they use to eat. The second sensor may keep track of how many times and the frequency with which the user moves their hand from a source of food to the user's mouth. In addition, embodiments of the invention may also be configured to track the user's eating habits using the second sensor. Certain embodiments may be configured to use the tracked weight and eating information to provide feedback to the user to improve that user's behavior with regard to his or her weight and eating habits. As with the first sensor, the second sensor may be in communication with the computing device.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

An exemplary embodiment includes a weight measurement sensor apparatus, a sensor apparatus to detect movement of a user's hand, and an application program that configures a computing device to communicate with the sensors and provide feedback and suggestions to a user of the invention.

Figure 1:
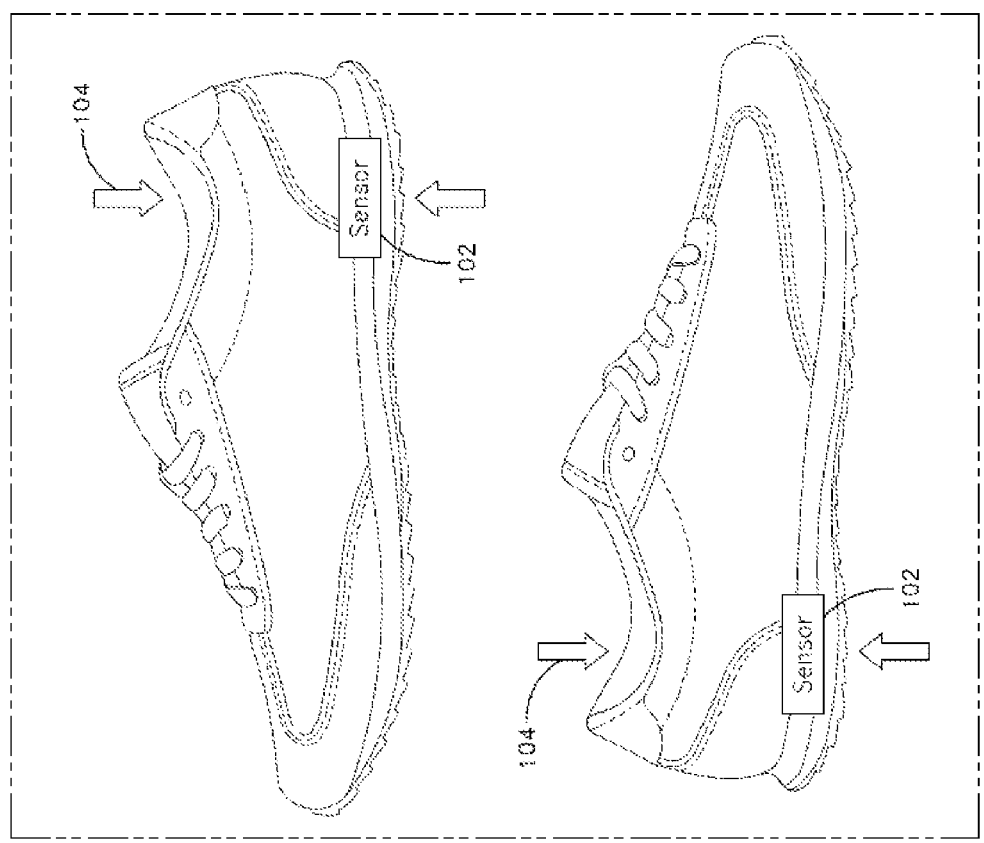
FIG. 1 is a diagram of an embodiment of a sensor apparatus positioned at a pair of shoes.

As is illustrated in FIG. 1, in an embodiment of the invention, a sensor apparatus may be installed in or on a user's shoes. As indicated, the sensors 102 may be mounted in the sole of each shoe. Alternatively, the sensor may be mounted in an insole or between an insert and the bottom surface of the shoe. In order to determine a user's total weight, two sensors may be required, one at each shoe. As is illustrated at 104, each sensor may measure the force applied by a user's foot to the ground upon which that foot rests. In certain embodiments of the invention, each shoe may be equipped with a plurality of sensors to more accurately determine a user's weight. The sensor apparatus may be equipped with circuitry or software instructions to determine conditions in which the user is standing in one place in order to more accurately determine that user's weight.

Figure 2:
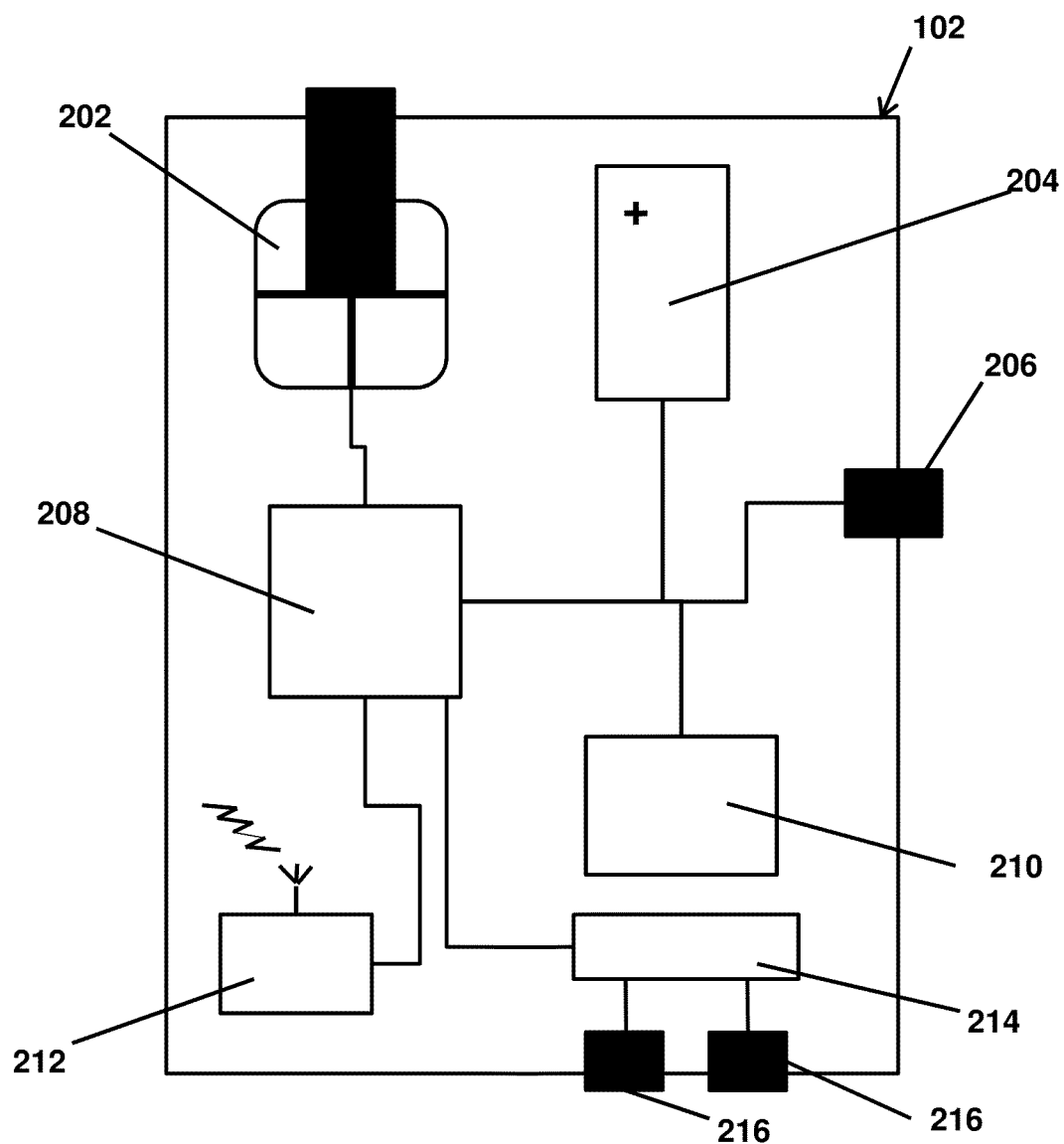
FIG. 2 is a block diagram of a first sensor apparatus.

A diagram of an example sensor apparatus is shown in FIG. 2. As is illustrated, a typical sensor apparatus 102 may comprise at least one pressure sensor 202, a battery 204, a power switch 206, a processor 208, a memory 210, and software instructions. The sensor apparatus may also be equipped with a communications interface 212 for communication between each sensor and also a computerized device. The sensor apparatus 102 may also comprise a body mass index calculator 214 and one or more interface sensors 216. The communications interface 212 may use a wired connection between sensors at the user's left foot and the user's right foot. Wires may also be used from one or both feet to a computerized device. However, a preferred embodiment may use a wireless communications interface between each foot and the computerized device. For example, an embodiment of the invention may utilize a personal area network such as Bluetooth® (Registered Trademark of Bluetooth SIG, Inc.). In order to detect the weight of a user, an embodiment of the invention may sum the weight measured at each foot. As was noted earlier, in an embodiment of the invention, the sensor apparatus installed in or on a user's shoes may determine when the user remains stationary enough for the apparatus to more accurately calculate the user's weight. In addition, the sensor apparatus may be configured to learn the approximate weight of the user in order to ignore variations in the determined weight that might result from conditions such as, but not limited to, the user leaning against an object, sitting in a chair or stool, or carrying objects that might add to the weight measured.

Figure 3:
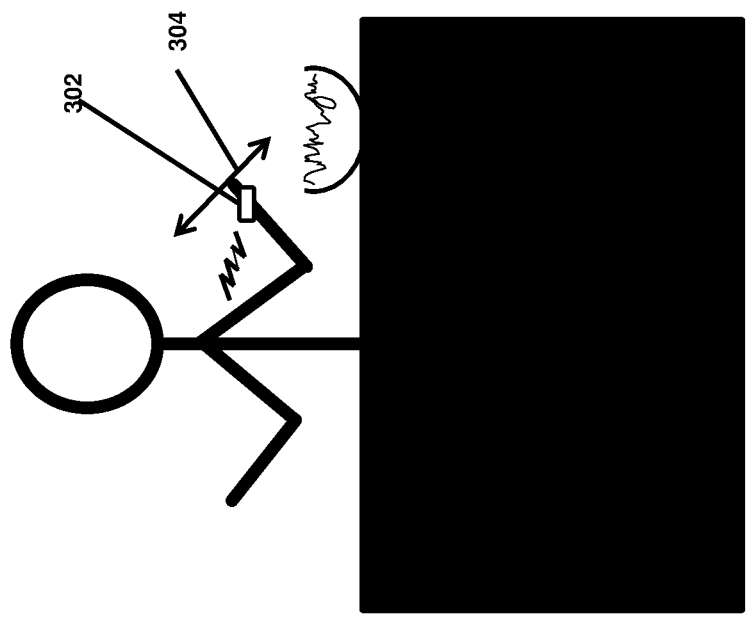
FIG. 3 is an illustration of a sensor apparatus which monitors the user's hand movements.

Referring to FIG. 3, in an embodiment of the invention, a second sensor apparatus 302 may be positioned at or near a user's hand. Because the intended purpose of this sensor apparatus is to detect a user moving food 304 from a location, such as a table, to the user's mouth, the sensor apparatus 302 should be positioned near the hand that is used by the user to place food in the user's mouth. Positioning of the sensor may be accomplished through the use of a watch or bracelet structure that contains the sensor mechanism. Another example embodiment may include a sensor comprised within a ring or other piece of jewelry worn on the user's hand. Still another embodiment may be a sensor contained within an eating utensil 306. Such an embodiment may have the advantage of being more likely to detect movements that were the result of a user placing food into their mouth rather than the user moving their hand near their face. Other embodiments may combine a sensor apparatus positioned at or near a user's hand (without limitation, a watch) with a sensor comprised within an eating utensil.

Figure 4:
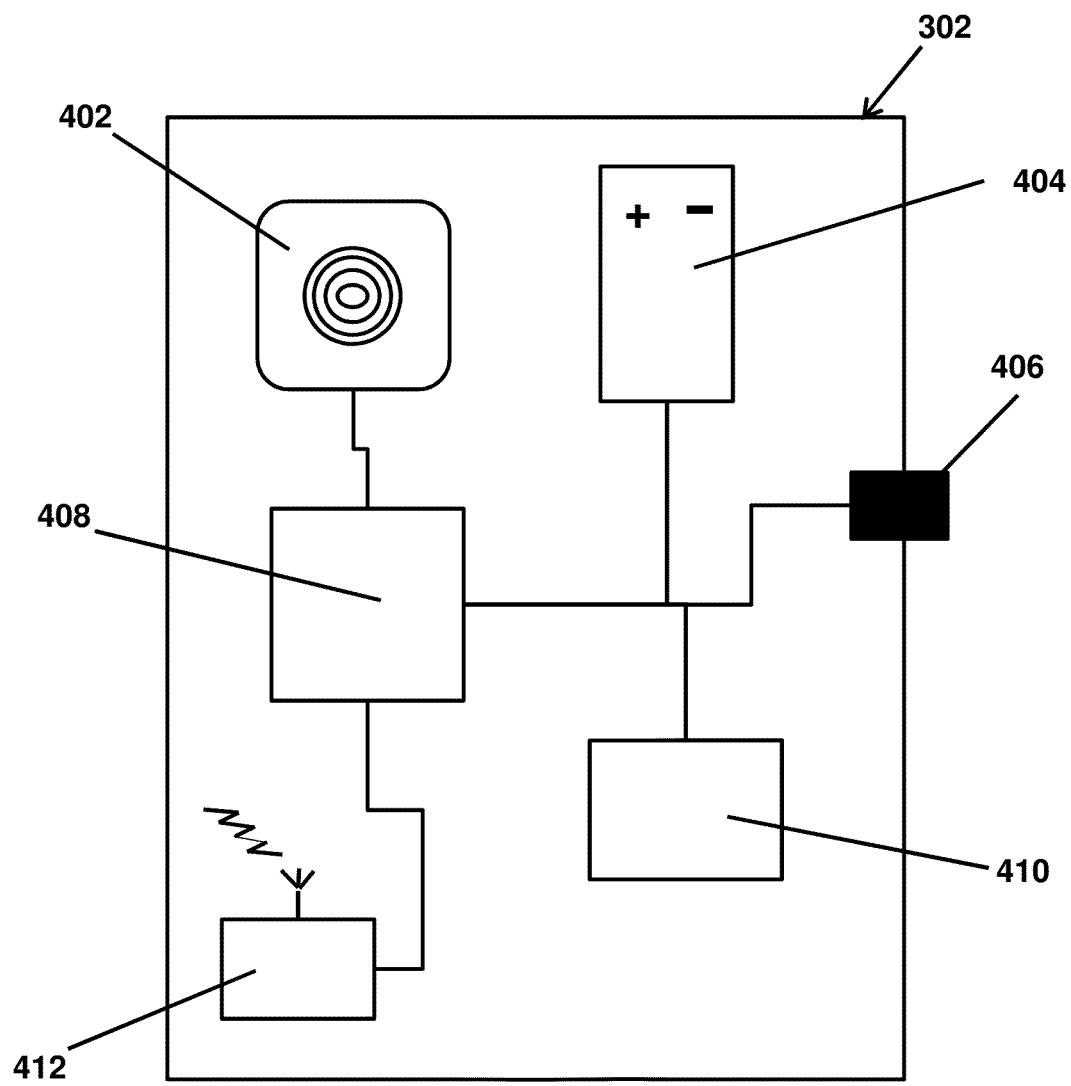
FIG. 4 is a block diagram of a second sensor apparatus.

Referring to the diagram of FIG. 4, in an exemplary embodiment, a second sensor apparatus 302 may comprise a movement or position sensor 402, a battery 404, a power switch 406, a processor 408, a memory 410, and software instructions. The second sensor apparatus may be provided with a communications interface 412 to allow communication with a computerize device. The interface may be formed with a wire connection, or in a preferred embodiment, be wireless. As with the sensor apparatus located at the user's feet, such a wireless connection may be formed using a personal area network such as Bluetooth®.

Figure 5:
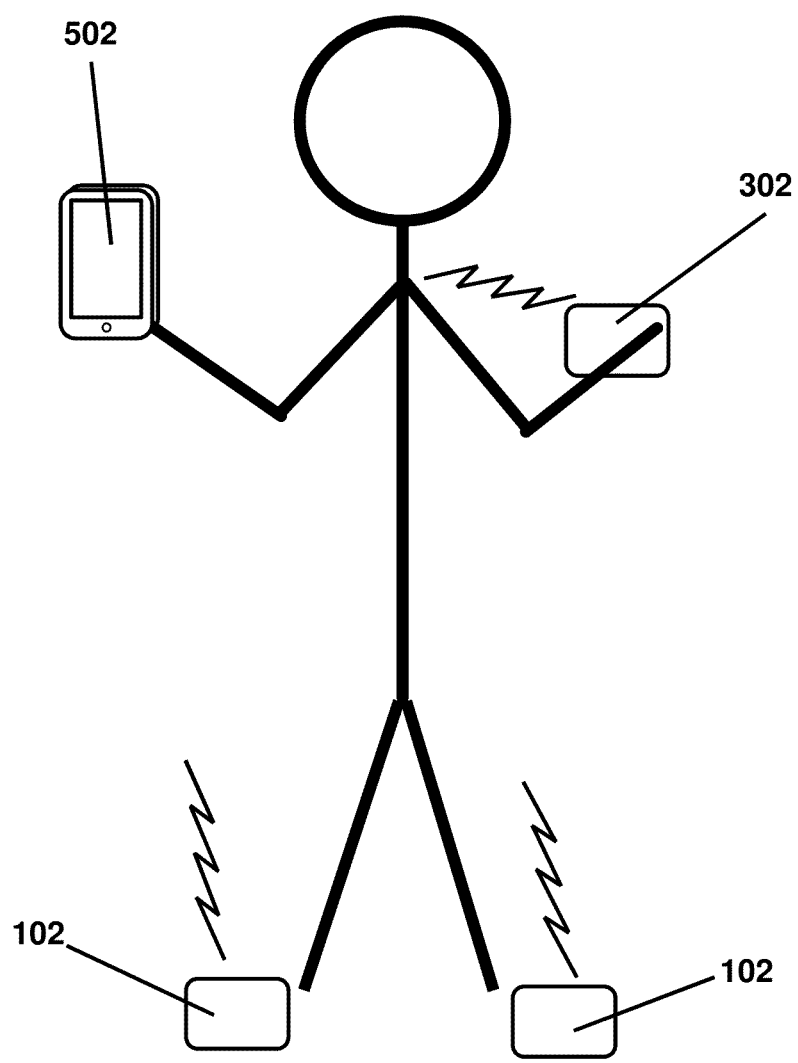
FIG. 5 is an illustration of a user illustrating an embodiment of the invention comprising a first and second sensor in communication with a computing device.
Figure 6:
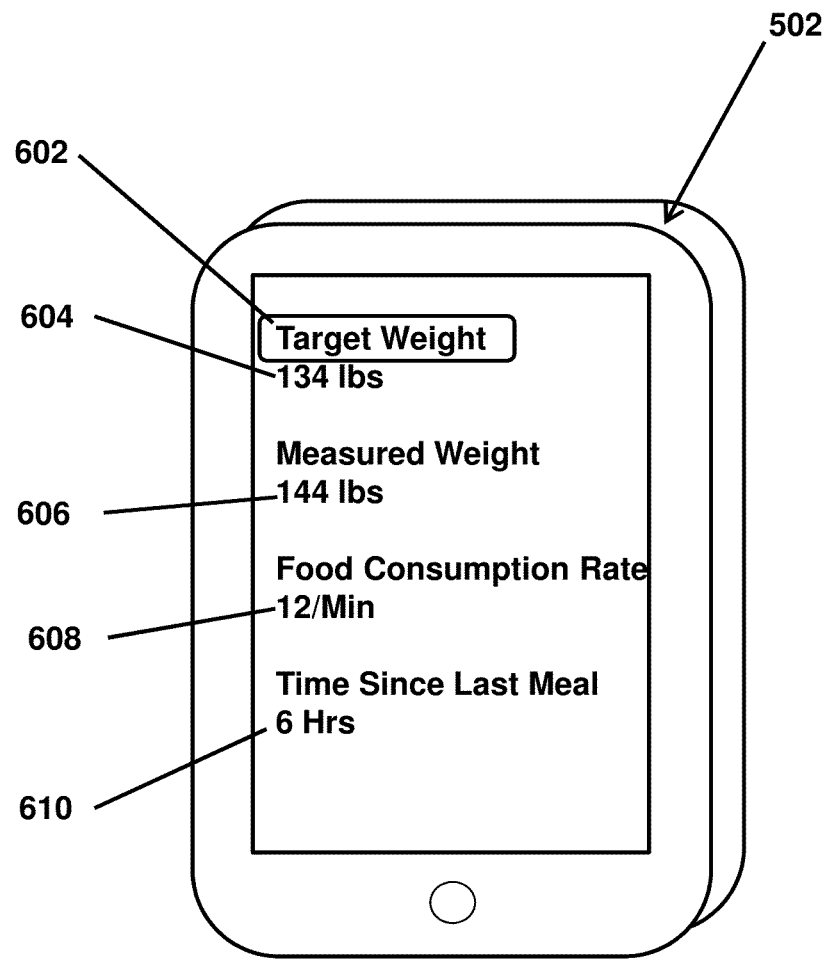
FIG. 6 is an illustration of a user interface used in an embodiment of the invention.

In an embodiment of the invention, a computing device may be configured by software to receive data from the first sensor apparatus and the second sensor apparatus. As is illustrated in FIG. 5, a user of an embodiment of the invention may wear shoes that are provided with a first sensor apparatus 102, wear a second sensor apparatus 302 and provide a computing device 502. As the user stands, the first sensor apparatus 102 may measure the weight of the user and provide that information to the computing device 502. The computing device 502 may be supplied with software instructions that configure the computing device to receive the weight information from the first sensor. The computing device 502 may store the received data and use it to determine an approximate weight of the user. In an embodiment of the invention, the computing device may compare the determined weight of the user over a period of time and use that comparison to determine if the user is gaining weight, losing weight, or remaining predominantly the same. In certain embodiments of the invention, a user may enter a desired target weight. Alternatively, an embodiment of the invention may calculate a target weight based on factors entered by the user. Using the desired or calculated weight, the computing device 502 may determine if the user is losing weight to reach the desired or calculated weight. An example user interface is illustrated in FIG. 6. As is shown, a user may select a control option 602 to select their desired weight 604. The user's measured weight may also be displayed 606.

Referring again to FIG. 3, a user may wear a second sensor apparatus 302 or utensil 306 when eating. The second sensor apparatus 302 or utensil 306 may detect when the user moves food toward their mouth. When such detection occurs, the sensor apparatus 302 or utensil 306 may detect a time when the food reaches the mouth of the user. In other embodiments, the sensor apparatus 302 or utensil 306 may provide an indication to the computing device 502, which performs the determination of time. In an embodiment of the invention, the determined time may be used to measure certain characteristics of the eating process. For example, in an embodiment of the invention, the computing device 502 may be able to calculate how many times the user places food in his or her mouth, how long a period the user spends eating, and the frequency that the user moves food to his or her mouth (a high frequency of movement may indicate that the user is eating too quickly). In the example user interface illustrated in FIG. 6, food consumption rate 608 and the time elapsed since the last detected meal 610 may be displayed.

Figure 7:
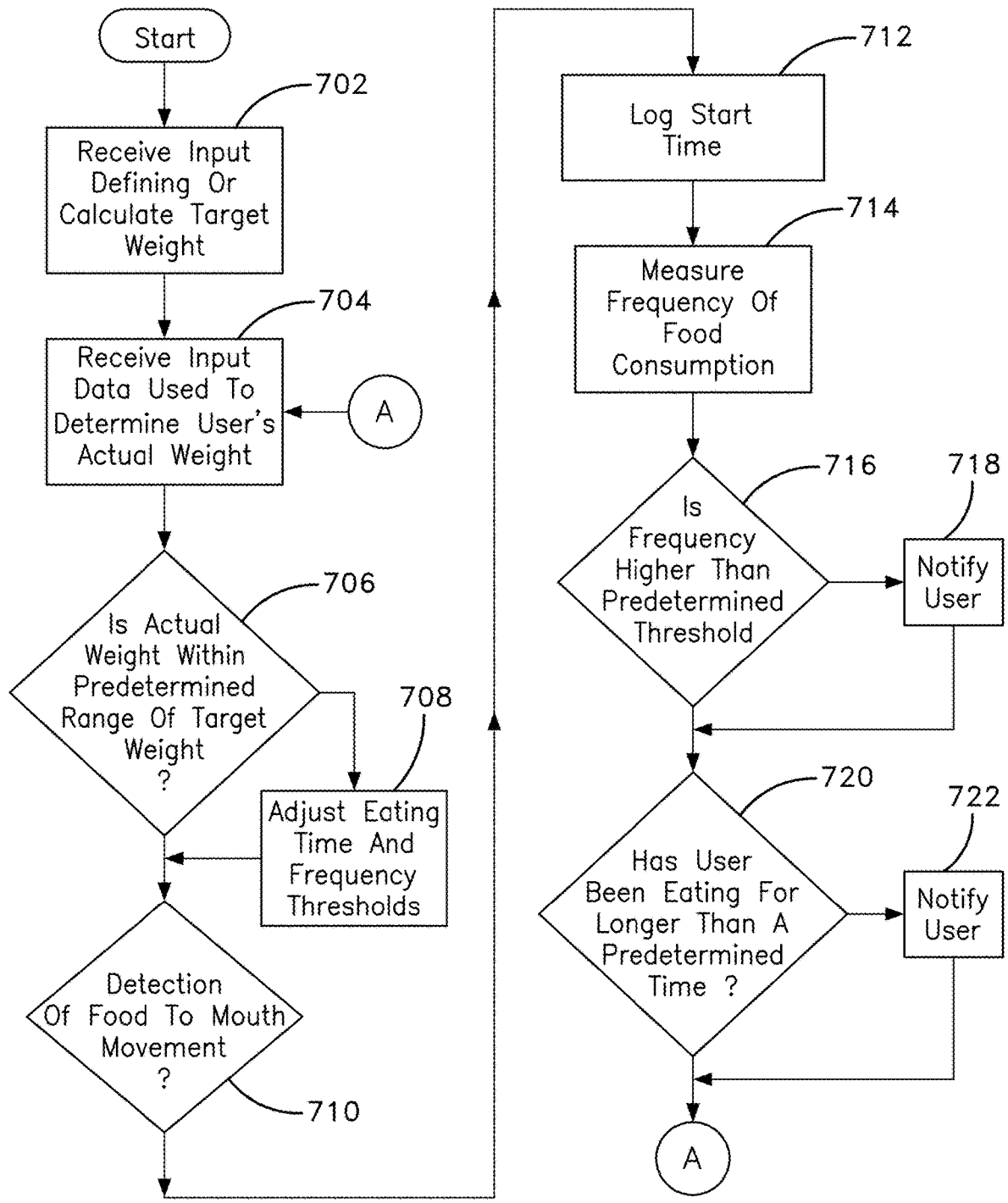
FIG. 7 is a flow chart of the steps used in an embodiment of the invention.
Figure 8:
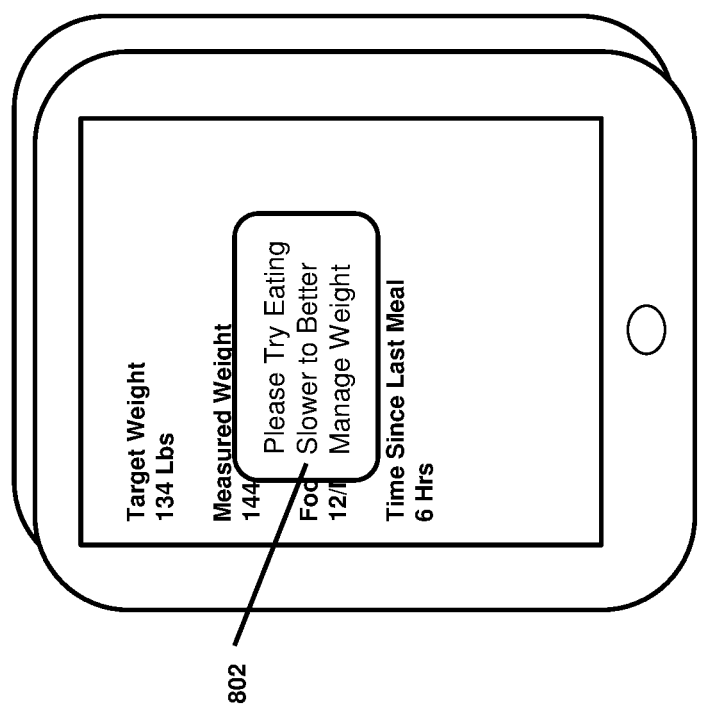
FIG. 8 is an illustration of a user interface used in an embodiment of the invention.

In an embodiment of the invention, the computing device executes software instructions to monitor the user's weight and eating habits and take action if these monitored characteristics exceed predetermined thresholds. In an embodiment of the invention, a range may be calculated based on a percentage of the user's weight and that range may be added to the desired user weight to avoid an excessive amount of feedback when the user's actual weight exceeds the desired weight by only a small amount. An example of the logical steps taken by a computing device executing software instructions according to an embodiment of the invention are illustrated in the flowchart of FIG. 7. As is illustrated, when first configured, a computing device 502 may receive or calculate a target weight for the user 702. In step 704, the computing device 502 may receive information from a first sensor apparatus 102 that indicates the user's weight. The computing device 502 may then determine if the received weight is within a predetermined range of the target weight 706. If the received weight exceeds the predetermined range, an embodiment of the invention may display an indication of that fact to the user. The computing device may adjust setpoints 708 used by the program to values designed to encourage eating behavior conducive to weight loss. After adjusting the program values in step 708, or if the measured weight is within the predetermined range, the computerized device may be configured to receive movement data from the second sensor apparatus in step 710. If the received movement data indicates movement toward the user's face in a manner that suggests food is being eaten, the computerized device may record a start time 712. In certain embodiments of the invention, the computerized device may also measure the time between each movement towards the user's face that suggests food is being eaten 714. The recorded start time and time between movements may be used in certain embodiments of the invention to provide feedback to the user in order to suggest behavior that would be conducive to managing their weight (steps 716 and 718). An illustration of an example user interface is illustrated in FIG. 8. As is shown, a suggestion that a user eats more slowly may be displayed 802. As is illustrated in steps 720 and 722, an embodiment of the invention may use the recorded start time and an actual time to determine if the user has been eating for longer than a predetermined time. If the predetermined time is exceeded, an embodiment of the invention may notify the user of the time in an attempt to modify that user's behavior. In certain embodiments of the invention, the computerized device may be configured to provide suggestions to the user with regard to meal times and food choices. For example, an embodiment of the invention may alert a user if that user has gone for a period of time without eating. Such a time period may lead to an unusually strong sensation of hunger that could result in a user overeating or eating too quickly. By avoiding such conditions, the user may make better food selections, resulting in better health and loss of excess weight.

As described above, in certain embodiments of the invention, data may be transmitted from the first sensor 102 and second sensor 302 or utensil 306 to a computing device 502. In certain embodiments of the invention, the sensors may store such data in memory located within each sensor for later transmission to the computing device. In such a configuration, the sensors may record data without the requirement that a computing device 502 be located such that a communications connection is continuously maintained between the computer device and the sensors (302 or 306).

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for tracking a weight of a user, the system comprising:
    an insole configured to be interchangeably located within each of a number of pairs of shoes associated with the user;
    a weight sensor located within the insole and configured to detect the weight of the user;
    a movement sensor locatable at a hand or wrist of the user and configured to detect movement of the user in a manner indicative of eating;
    a computerized device comprising a display, at least one electronic storage device, at least one processor;
    a first communications interface electrically connected to the weight sensor, wherein said communications interface is configured to transmit weight readings from said weight sensor to the computerized device; and
    a second communications interface electrically connected to the movement sensor and configured to transmit movement readings from the movement sensor to the computerized device;
    wherein the computerized device is configured to receive said weight readings and said movement readings and generate notifications for display at said display regarding said weight reading and said movement readings.

2. The system of claim 1 wherein:
    said computerized device comprises user input system and software instructions stored on the at least one electronic storage device, which when executed, configure the at least one processor to:
    determine a target user weight from input received at said user input system; and
    generate said notifications where the weight readings are greater than the target user weight by more than a predetermined amount.

3. The system of claim 2, further comprising:
    additional software instructions, stored on the at least one electronic storage device, which when executed, configure the at least one processor to determine the target user weight by:
    displaying, at the display, a user height prompt;
    receiving a user height input at the user input system;
    displaying, at the display, a user gender prompt;
    receiving a user gender input at the user input system; and
    determining the target user weight based upon the user height and gender inputs in accordance with an ideal estimated body mass index corresponding to the user height and gender inputs.

4. The system of claim 2, further comprising:
    additional software instructions, stored on the at least one electronic storage device, which when executed, configure the at least one processor to determine the target user weight by:
    displaying, at the display, a desired weight; and
    receiving a desired weight input at the user input system.

5. The system of claim 2, wherein:
    the predetermined amount is a percentage of the target user weight.

6. The system of claim 1, further comprising:
    additional software instructions stored at the at least one electronic storage device, which when executed, configure the at least one processor to:
    display, at the display, a physical information prompt;
    receive a physical information input at the user input system;
    calculate a body mass index for the user based on the physical information input and the weight readings; and
    display, at the display, the body mass index.

7. The system of claim 1, wherein:
    the computerized device comprises a smartphone; and
    the movement sensor is provided within an eating utensil.

8. The system of claim 1, wherein:
    the computerized device comprises a smart watch; and
    the movement sensor is provided within the smart watch.

9. The system of claim 1, further comprising:
    a second insole configured to be interchangeably located within an opposing one of each of the number of the pairs of shoes associated with the user;
    a second weight sensor located within the second insole and configured to detect the weight of the user; and
    a second communications interface located at the second insole and electrically connected to the second weight sensor, wherein said second communications interface is configured to transmit a second set of weight readings from said second weight sensor to the computerized device.

10. The system of claim 1, further comprising:
    a battery located within the insole and electrically connected to the weight sensor and the communications interface; and
    a power switch located within the insole and electrically connected to the weight sensor, the battery, and the communications interface;
    wherein the weight sensor comprises a pressure sensor.

11. A system for tracking a weight of a user, the system comprising:

a right foot insole configured to be interchangeably located within a right foot one of each of a number of pairs of shoes associated with the user;
a first weight sensor located at the right foot insole and configured to detect the weight of the user, said first weight sensor comprising:
a first pressure sensor;
a first communications interface electrically connected to the first pressure sensor;
a first battery electrically connected to the first pressure sensor and the first communications interface;
a left foot insole configured to be interchangeably located within a left foot one of each of the number of the user's pairs of shoes associated with the user;
a second weight sensor located at the left foot insole and configured to detect the weight of the user, said second weight sensor comprising:
a second pressure sensor;
a second communications interface electrically connected to the second pressure sensor;
a second battery electrically connected to the second pressure sensor and the second communications interface;
a movement sensor integrated with an eating utensil or configured to be removably secured to a wrist of a user;
a personal electronic device in electronic communication with the first and second communication interfaces and said movement sensor, said personal electronic device comprising an electronic display, a user input system, at least one processor, and software instructions stored on at least one electronic storage device, which when executed by the at least one processor, configures the at least one processor to:
receive weight readings from the first weight sensor and the second weight sensor;
receive movement data from said movement sensor;
determine instances when said movement indicates that the user is eating;
determine a target user weight;
display the weight readings; and
generate notifications comprising health messages during said instances when a prior one of said weight readings indicate that a current weight for said user is above the target user weight by at least a predetermined amount.

12. The system of claim 11 further comprising:
additional software instructions, stored on the at least one electronic storage device, which when executed by the at least one processor, configures the at least one processor to determine the target user weight by:

displaying on the electronic display, a desired weight prompt; and
receiving a desired weight input, wherein said target user weight matches the desired weight input.

13. The system of claim 11 further comprising:
additional software instructions stored on the at least one electronic storage device, which when executed by the at least one processor, configures the at least one processor to:
generate a user height, gender, and weight prompt at the electronic display for the user to provide height, weight, and gender information;
determine the target user weight from the height, weight, and gender information entered at the user height, gender, and weight prompt.

14. The system of claim 13 wherein:
the predetermined amount is a percentage of the target user weight.

15. The system of claim 11 wherein:
the personal electronic device comprises a smartphone; and
the movement sensor is provided at a smart watch.

16. The system of claim 11 further comprising:
a first power switch located at the right foot insole and electrically connected to the first weight sensor; and
a second power switch located at the left foot insole and electrically connected to the second weight sensor.

17. A system for tracking a weight of a user, the system comprising:
a computerized device comprising a display;
an insole configured to be interchangeably located within each right or left side one of a number of pairs of shoes associated with the user and comprising:
one or more pressure sensors for detecting the weight of the user;
a communication interface electrically connected to the one or more pressure sensors and configured to wirelessly transmit data to said computerized device;
a power supply;
a processor; and
an electronic storage device comprising body mass index calculator module and software instructions, which when executed, configure the processor to:
receive data from the one or more pressure sensors to determine user weight readings;
determine user body mass index readings based on the user weight readings and the body mass index calculator module; and
transmit the user body mass index readings to said computerized device for display.

* * * * *